US012748191B2

(12) United States Patent
Liu et al.

(10) Patent No.: US 12,748,191 B2

(45) Date of Patent: Sep. 29, 2026

(54) THREE-DIMENSIONAL SCANNING RANGING DEVICE AND METHOD

(71) Applicant: CHINA SCIENCE PHOTON CHIP (HAINING) TECHNOLOGY CO., LTD., Jiaxing (CN)

(72) Inventors: Jingwei Liu, Jiaxing (CN); Wenling Li, Jiaxing (CN); Zhonghui Wei, Jiaxing (CN)

(73) Assignee: CHINA SCIENCE PHOTON CHIP (HAINING) TECHNOLOGY CO., LTD., Jiaxing (CN)

( * ) Notice: Subject to any disclaimer, the term of this patent is extended or adjusted under 35 U.S.C. 154(b) by 672 days.

(21) Appl. No.: 18/256,802

(22) PCT Filed: Sep. 9, 2021

(86) PCT No.: PCT/CN2021/117345

§ 371 (c)(1),
(2) Date: Jun. 9, 2023

(87) PCT Pub. No.: WO2022/127212

PCT Pub. Date: Jun. 23, 2022

(65) Prior Publication Data

US 2024/0027586 A1 Jan. 25, 2024

(30) Foreign Application Priority Data

Dec. 14, 2020 (CN) ......................... 202011474521.2

(51) Int. Cl.
*G01S 7/481* (2006.01)
*G01S 17/894* (2020.01)

(52) U.S. Cl.
CPC .......... *G01S 7/4817* (2013.01); *G01S 7/4816* (2013.01); *G01S 17/894* (2020.01)

(58) Field of Classification Search
CPC ............ G01B 11/2513; G01B 11/2518; G01S 17/894; G01S 7/4816; G01S 7/4817
See application file for complete search history.

(56) References Cited

U.S. PATENT DOCUMENTS

2004/0118916 A1 6/2004 He
2004/0125381 A1* 7/2004 Chen ...................... G01B 11/25 356/603

(Continued)

FOREIGN PATENT DOCUMENTS

CN 1726501 A 1/2006
CN 102232197 A 11/2011

(Continued)

OTHER PUBLICATIONS

International Search Report issued Dec. 14, 2021, for PCT/CN2021/117345, 9 pages.

(Continued)

*Primary Examiner* — Md N Haque
(74) *Attorney, Agent, or Firm* — Vorys, Sater, Seymour and Pease LLP; Rex W. Miller, II

(57) ABSTRACT

A three-dimensional scanning ranging device, including: an optical scanning chip (1), a focusing lens (2), a light receiving element (3) and a microprocessor, wherein the optical scanning chip (1) may be used for sequentially scanning and outputting line-shaped light spots of a plurality of scanning angles onto a to-be-measured object, the focusing lens (2) may be used for sequentially focusing a plurality of light beams reflected from the to-be-measured object under irradiation of the line-shaped light spots, the light receiving element (3) may be used for sequentially receiving the plurality of light beams after being focused by the focusing lens (2) so as to obtain multiple images containing a bright spot, the microprocessor may be used for analyzing, on the basis of a first relationship between the bright spot and a (Continued)

depth of the to-be-measured object at different scanning angles and in different pixel rows, the multiple images containing a bright spot so as to obtain a three-dimensional point cloud of the to-be-measured object. The optical scanning chip is adopted to perform a line-shaped light spot scanning and analyze the light spot in the light receiving element, thereby mechanical rotary scanning parts can be omitted, the functionalities of 3D Solid-state LiDARs are achieved, and a relatively better ranging accuracy in short-distance ranging is achieved. Further disclosed is a three-dimensional scanning ranging method.

12 Claims, 4 Drawing Sheets

(56) References Cited

U.S. PATENT DOCUMENTS

| | | | | |
|---|---|---|---|---|
| 2012/0188559 | A1* | 7/2012 | Becker | G01S 17/42 356/612 |
| 2017/0224272 | A1* | 8/2017 | Liu | A61B 5/4547 |
| 2017/0254639 | A1* | 9/2017 | Wong | G01B 11/0608 |
| 2018/0227571 | A1 | 8/2018 | Page et al. | |
| 2020/0141722 | A1* | 5/2020 | Körner | G01B 11/2513 |
| 2022/0155059 | A1* | 5/2022 | Wang | G06T 7/521 |

FOREIGN PATENT DOCUMENTS

| | | | |
|---|---|---|---|
| CN | 102721378 | A | 10/2012 |
| CN | 102865833 | A | 1/2013 |
| CN | 204043621 | U | 12/2014 |
| CN | 105136027 | A | 12/2015 |
| CN | 106482663 | A | 3/2017 |
| CN | 106597461 | A | 4/2017 |
| CN | 106969724 | A | 7/2017 |
| CN | 107167073 | A | 9/2017 |
| CN | 107219532 | A | 9/2017 |
| CN | 107271984 | A | 10/2017 |
| CN | 107607064 | A | 1/2018 |
| CN | 108534710 | A | 9/2018 |
| CN | 108917640 | A | 11/2018 |
| CN | 109341566 | A | 2/2019 |
| CN | 109458928 | A | 3/2019 |
| CN | 107063129 | B | 6/2019 |
| CN | 110208569 | A | 9/2019 |
| CN | 110220481 | A | 9/2019 |
| CN | 110360929 | A | 10/2019 |
| CN | 209765176 | U | 12/2019 |
| CN | 111175890 | A | 5/2020 |
| CN | 111289955 | A | 6/2020 |
| CN | 112504126 | A | 3/2021 |
| JP | 2017533000 | A | 11/2017 |
| TW | 201544788 | A | 12/2015 |
| WO | 2020186825 | A1 | 9/2020 |

OTHER PUBLICATIONS

Notice of First Review Opinion issued Jan. 19, 2022, in Chinese Application No. 202011474521.2, 27 pages.
Notice of Second Review Opinion issued Jul. 11, 2022, in Chinese Application No. 202011474521.2, 25 pages.
Written Opinion of the International Searching Authority issued Dec. 14, 2021, for PCT/CN2021/117345, 10 pages.
Extended European Search Report issued Mar. 28, 2024, in 21905144.8, 7 pages.

* cited by examiner

THREE-DIMENSIONAL SCANNING RANGING DEVICE AND METHOD

CROSS-REFERENCE TO RELATED APPLICATIONS

This application is a national stage of International Patent Application PCT/CN2021/117345 filed Sep. 9, 2021, which claims priority to Chinese Patent Application No. 202011474521.2 filed Dec. 14, 2020, which are incorporated by reference herein in their entirety.

TECHNICAL FIELD

The present application relates to the field of depth measurement, and specifically relates to a three-dimensional scanning ranging device and a method thereof.

BACKGROUND

A three-dimensional laser scanner scans a measured object by emitting laser so as to obtain the three-dimensional coordinates of the surface of the measured object. Three-dimensional laser scanning technology is also referred to as real scene reproduction technology and has the advantages of high efficiency and high precision in measurement. Three-dimensional laser scanning is another round of technological revolution in the field of Surveying and Mapping since the emergence of GPS technology. Three-dimensional laser scanners are widely applied to the fields of structure surveying, construction surveying, shipbuilding, railway construction, engineering construction, and the like. In recent years, three-dimensional laser scanners have been developing towards being mobile from being stationary, and the most representative ones are vehicle-mounted three-dimensional laser scanners and on-board three-dimensional laser radars (LiDAR). However, the current three-dimensional laser scanners are of complicated structure and relatively large bulk.

SUMMARY OF THE INVENTION

In light of the above, a three-dimensional scanning ranging device and a method thereof are provided by embodiments of the present application to solve the technical problem of three-dimensional laser scanners having complicated structure in the prior art.

Technical solutions provided by embodiments of the present application are as follows.

Provided by a first aspect of embodiments of the present application is a three-dimensional scanning ranging device that includes an optical scanning chip, a focusing lens, a light receiving element and a microprocessor, wherein the optical scanning chip may be used for sequentially scanning and outputting line-shaped light spots of a plurality of scanning angles, and irradiating the line-shaped light spots onto a to-be-measured object; the focusing lens may be used for sequentially focusing a plurality of light beams reflected from the to-be-measured object under irradiation of the line-shaped light spots; the light receiving element may be used for sequentially receiving the plurality of light beams focused by the focusing lens so as to obtain multiple images containing a bright spot; the microprocessor is coupled to the light receiving element and may be used for receiving the multiple images containing a bright spot, and analyzing, on the basis of a first relationship between the bright spot and a depth of the to-be-measured object at different scanning angles and in different pixel rows, the multiple images containing a bright spot so as to obtain a three-dimensional point cloud of the to-be-measured object.

Optionally, the optical scanning chip may be further used for sequentially scanning and outputting line-shaped light spots of a plurality of scanning angles and respectively irradiating the line-shaped light spots onto flat panels located at various distances from the optical scanning chip; the focusing lens may be further used for sequentially focusing a plurality of light beams reflected from the flat panels under irradiation of the line-shaped light spots; the light receiving element may be further used for sequentially receiving the plurality of light beams focused by the focusing lens so as to obtain multiple images containing a bright line; the microprocessor may be further used for receiving the multiple images containing a bright line, and calculating, on the basis of a location of the bright line and a distance between the flat panel and the optical scanning chip, the first relationship at different scanning angles and in different pixel rows.

Optionally, the optical scanning chip, the focusing lens and the light receiving element may be located on a same plane.

Optionally, a distance between the optical scanning chip and the light receiving element may be a fixed value.

Optionally, the optical scanning chip may include any one of an optical phased array, an optical switch and a MEMS optical scanning mirror.

Optionally, the light receiving element may be a charge-coupled device or a CMOS camera.

Provided by a second aspect of embodiments of the present application is a three-dimensional scanning ranging method, which includes sequentially scanning and outputting line-shaped light spots of a plurality of scanning angles, and irradiating the line-shaped light spots onto a to-be-measured object; receiving and sequentially focusing a plurality of light beams reflected from the to-be-measured object under irradiation of the line-shaped light spots; collecting, after being focused, the plurality of light beams so as to obtain multiple images containing a bright spot; and analyzing, on the basis of a first relationship between the bright spot and a depth of the to-be-measured object at different scanning angles and in different pixel rows, the multiple images containing a bright spot so as to obtain a three-dimensional point cloud of the to-be-measured object.

Optionally, the analyzing, on the basis of a first relationship between the bright spot and a depth of the to-be-measured object at different scanning angles and in different pixel rows, the multiple images containing a bright spot so as to obtain a three-dimensional point cloud of the to-be-measured object may include: analyzing the multiple images containing a bright spot so as to obtain a location of the bright spot in each pixel row in each of the multiple images; acquiring, on the basis of the first relationship, depth information corresponding to the location of the bright spot in each pixel row; acquiring, according to the depth information, a point cloud corresponding to each of the scanning angles; acquiring, according to all of the point clouds corresponding respectively to all of the scanning angles, the three-dimensional point cloud of the to-be-measured object.

Optionally, the first relationship between the bright spot and a depth of the to-be-measured object at different scanning angles and in different pixel rows may be calculated by the following steps: sequentially scanning and outputting, by an optical scanning chip, line-shaped light spots of a plurality of scanning angles and respectively irradiating the line-shaped light spots onto flat panels located at various distances from the optical scanning chip; sequentially focusing a plurality of light beams reflected from the flat panels under irradiation of the line-shaped light spots; receiving, after being focused, the plurality of light beams so as to obtain multiple images containing a bright line; calculating, according to a location of the bright line in the different pixel rows in the image at the different scanning angles and a distance between the flat panel and the optical scanning chip, the first relationship at different scanning angles and in different pixel rows.

Optionally, the sequentially scanning and outputting, by an optical scanning chip, line-shaped light spots of a plurality of scanning angles and respectively irradiating the line-shaped light spots onto flat panels located at various distances from the optical scanning chip may include: placing the flat panel at a first location that is at a first distance from the optical scanning chip; scanning, by using the line-shaped light spots, the flat panel that is at the first location; changing a horizontal distance between the flat panel and the optical scanning chip; and sequentially scanning, by using the line-shaped light spots, the flat panel at various locations.

The technical solution of the present application has advantages as follows: The three-dimensional scanning ranging device, which is provided by embodiments of the present application, performs a laser ranging by selecting an optical scanning chip, a focusing lens and a light receiving element, wherein the optical scanning chip can perform a reciprocating scanning of line-shaped light spots, the light reflected by the to-be-measured object is focused by the focusing lens and enters the light receiving element to form a bright spot, there exists a nonlinear relation between the location of the bright spot and the depth of the to-be-measured object, the depth of the object can be obtained according to the location of the bright spot in an image received by the receiving element on the basis of the nonlinear relation, thereby obtaining a three-dimensional point cloud of the to-be-measured object. Therefore, in the three-dimensional scanning ranging device which is provided by embodiments of the present application, an optical scanning chip is employed to perform a scan of the line-shaped light spots and an analysis is performed on the bright spots received in the light receiving element, so that mechanical rotary scanning parts can be omitted, functionalities of 3D Solid-state LiDARs are achieved, and a relatively better ranging accuracy in short-distance ranging is achieved.

In the three-dimensional scanning ranging device, which is provided by embodiments of the present application, a three-dimensional point cloud of the to-be-measured object is obtained by means of a first relationship at different scanning angles and in different pixel rows, therefore, the frame rate and point cloud density of the 3D point cloud can be increased by increasing the left-right scanning speed of the optical scanning chip, reducing the step value of scanning angle, and increasing the frame rate and the pixel resolution rate of the CCD, thereby the accuracy of ranging is improved.

In the three-dimensional scanning ranging method, which is provided by embodiments of the present application, a to-be-measured object is scanned by adopting a line-shaped light spot, a bright spot image is obtained by reflecting and focusing after irradiating line-shaped light spots onto the to-be-measured object. Because there exists a nonlinear relation between the location of the bright spot and the depth of the to-be-measured object, the location of the bright spot in the bright spot image can be obtained on the basis of the nonlinear relation so as to obtain the depth of the object, thereby obtaining a three-dimensional point cloud of the to-be-measured object. Therefore, the three-dimensional scanning ranging method, which is provided by embodiments of the present application, achieves the functionalities of 3D Solid-state LiDARs by the way of line-shaped light spot scanning, thereby a relatively better ranging accuracy in short-distance ranging is achieved.

BRIEF DESCRIPTION OF THE DRAWINGS

For more clearly illustrating the technical solutions in detailed embodiments of the present application or in the conventional art, the accompanying drawings, which are needed for describing the detailed embodiments or the conventional art, will be briefly introduced hereinafter. Apparently, the accompanying drawings described below refer to some embodiments of the present application, and other drawings can be acquired on the basis of the accompanying drawings illustrated herein, by those skilled in the art without making any creative effort.

DETAILED DESCRIPTION OF EMBODIMENTS

A description of technical solutions of the present application will be presented in a clear and complete fashion hereinafter by reference to the accompanying drawings. Apparently, the embodiments described herein are not all but some of the embodiments of the present application.

Any other embodiment that can be acquired, on the basis of the embodiments described in the present application, by those skilled in the art without making any creative effort, shall be encompassed within the scope of protection of the present application.

In the description of the present application, it should be noted that, directions or positional relationships indicated by the terms “center”, “upper”, “lower”, “left”, “right”, “vertical”, “horizontal”, “inside”, “outside” and the like are based on the directions or positional relationships illustrated in the accompanying drawings, which are merely for the purpose of facilitating the description of the present application and simplifying the description and are not indicative or suggestive of the corresponding device or element necessarily being in or being constructed/operated in a specific orientation, and thus these terms are not to be understood as a limitation on the present application. In addition, the terms “first,” “second,” “third” and the like are used for descriptive purposes only and are not to be understood as being indicative or suggestive of relative importance. In the description of the present application, it should be noted that, unless otherwise specified or defined, the terms "installed", "connected", "coupled" or the like should be broadly understood, for instance, it may be a fixed connection, a detachable connection or an integral connection, may be a mechanical connection or an electrical connection, may be a direct connection or an indirect connection via an intermediate medium, or otherwise may be an interior communication between two elements, and it may be a wireless connection or a wired connection. For those skilled in the art, specific meanings of the above terms in the present application can be understood according to the specific circumstances thereof.

Moreover, technical features involved in different embodiments of the present application described hereinafter can be combined with one another, unless mutually contradicted.

Embodiment 1

Figure 1:
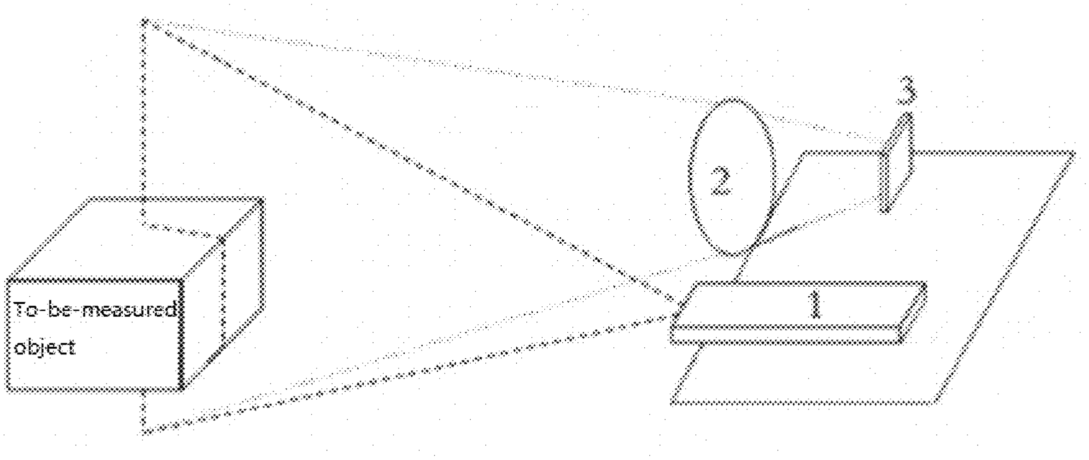
FIG. 1 is a structural block diagram of a three-dimensional scanning ranging device according to an embodiment of the present application.
Figure 2:
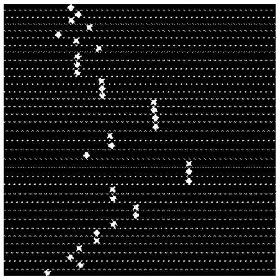
FIG. 2 is a structural schematic diagram of spot locations acquired by a three-dimensional scanning ranging device according to an embodiment of the present application.

Provided by an embodiment of the present application is a three-dimensional scanning ranging device, as shown in FIG. 1, which may include an optical scanning chip 1, a focusing lens 2, a light receiving element 3 and a microprocessor. The optical scanning chip 1 may be used for sequentially scanning and outputting line-shaped light spots of a plurality of scanning angles and irradiating the line-shaped light spots onto a to-be-measured object. The focusing lens 2 may be used for sequentially focusing a plurality of light beams reflected from the to-be-measured object under irradiation of the line-shaped light spots. The light receiving element 3 may be used for sequentially receiving the plurality of light beams after being focused by the focusing lens 2 so as to obtain multiple images containing a bright spot. The microprocessor, which is connected to the light receiving element 3, may be used for receiving the multiple images containing a bright spot, analyzing, on the basis of a first relationship between the bright spot and a depth of the to-be-measured object at different scanning angles and in different pixel rows, the multiple images containing a bright spot so as to obtain a three-dimensional point cloud of the to-be-measured object. An image containing light spots is shown in FIG. 2. Optionally, the optical scanning chip may include any one of an optical phased array, an optical switch and a MEMS (Micro-Electro-Mechanical Systems) optical scanning mirror. The light receiving element is a charge-coupled device (CCD) or CMOS (Complementary Metal Oxide Semiconductor) camera.

In a specific embodiment, the measurement range of the three-dimensional scanning ranging device can reach 10 meters, and the smaller the distance, the higher the measurement accuracy. The optical scanning chip may receive and process laser beams that are externally input, perform sequential scanning and outputting of line-shaped light spots; alternatively, a light-emitting laser may be integrated internally, that is, the optical scanning chip directly outputs a line-shaped light spot without external assistance. The three-dimensional scanning ranging device provided by embodiments of the present application may perform a laser ranging by using the optical scanning chip, the focusing lens and the light receiving element, wherein the optical scanning chip can perform a reciprocating scanning of line-shaped light spots, the light reflected by the to-be-measured object may be focused by the focusing lens and enters the light receiving element to form a bright spot, there exists a nonlinear relation between the location of the bright spot and the depth of a to-be-measured object, the depth of the object can be obtained according to the location of the bright spot in an image received by the receiving element on the basis of the nonlinear relation, thereby obtaining a three-dimensional point cloud of the to-be-measured object. Therefore, in the three-dimensional scanning ranging device which is provided by embodiments of the present application, the optical scanning chip is employed to perform a scan of the line-shaped light spots and an analysis is performed on the bright spots received in the light receiving element, so that mechanical rotary scanning parts can be omitted, functionalities of 3D Solid-state LiDARs are achieved, and a relatively better ranging accuracy in short-distance ranging is achieved.

In an embodiment, since the light output by the optical scanning chip is in a vertical line shape, when the to-be-measured object is a vertical flat panel and the scanning angle of the optical scanning chip is at a certain angle, the image presented on the CCD would be a quasi-vertical bright line, accordingly, in order to determine the first relationship between a location of the bright spot of different scanning angles and the depth of the to-be-measured object, a flat panel may be used as the to-be-measured object to perform a calculation thereon. To be specific, the optical scanning chip is further used for sequentially scanning and outputting line-shaped light spots of a plurality of scanning angles and respectively irradiating the line-shaped light spots onto flat panels located at various distances from the optical scanning chip. The focusing lens is further used for sequentially focusing a plurality of light beams reflected from the flat panels under irradiation of the line-shaped light spots. The light receiving element is further used for receiving the plurality of light beams after being focused by the focusing lens so as to obtain multiple images containing a bright line. The microprocessor is further used for receiving the multiple images containing a bright line, and calculating, on the basis of a location of the bright line and a distance between the flat panel and the optical scanning chip, the first relationship at different scanning angles and in different pixel rows. Herein, the relationship between the location x of the bright spot which is sequentially focused and the depth y may be generally expressed as $y=f(a_0, a_1, \ldots a_n, x)$, which indicates that n constants need to be calculated, that is, forming simultaneous equations of n equations by actually measuring n groups of y values and x values, thereby figuring out the values of $a_0$ to $a_n$. Too many constants may increase the complexity of the calculation, so n may be selected to be 3, the first relationship can be expressed as $y=f(a_0, a_1, a_2, x)$. In this case, all that is needed to do is to scan a flat panel disposed at three different locations in order to determine the first relationship.

In a specific embodiment, the optical scanning chip and the CCD are placed on the same plane. A line-shaped light spot output by the optical scanning chip is perpendicular to this plane. A flat panel may be placed at a location which is at a horizontal distance of $d_0$ from the optical scanning chip. The image formed on the CCD after reflection by the flat panel at the first scanning angle and focusing may be obtained. The numerical value of the first row of pixels in the image may be analyzed so as to obtain the location with the highest brightness in the first row of pixels. The distance between this location and the leftmost edge of the CCD may be determined to be $x_0$ pixels and the equation of $d_0=f(a_0, a_1, a_2, x_0)$ may be obtained from $x_0$ and the distance dd. Then the location of the flat panel is changed so that the flat panel is located at the locations of a distance $d_1$ and a distance $d_2$ respectively, and the locations $x_1$ and $x_2$ with the highest brightness in the first row of pixels are selected so as to obtain the equation of $d_1=f(a_0, a_1, a_2, x_1)$ and the equation of $d_2=f(a_0, a_1, a_2, x_2)$. By combining these three equations obtained, the values of $a_0$, $a_1$, and $a_2$ can be solved, so as to obtain the first relationship corresponding to the first row of pixels at the first scanning angle. Then, other pixel rows in the image may be selected, and the first relationships corresponding to other pixel rows may be obtained according to the above method. And then, the images obtained by the optical scanning chip at other scanning angles may be selected so as to obtain the first relationships of the respective different pixel rows at other scanning angles, and finally the first relationship at different scanning angles and in different pixel rows may be obtained.

In an embodiment, after the first relationship is obtained, a three-dimensional point cloud of the to-be-measured object may be obtained according to the first relationship by adopting the optical scanning chip, the focusing lens, the light receiving element and the microprocessor. Herein, the relative location between the optical scanning chip and the CCD should remain the same as before. Herein, when the microprocessor analyzes the multiple images containing a bright spot, first, the image collected at the first scanning angle may be firstly obtained, and the numerical values of each row of pixels in the image may be analyzed so as to obtain the location of the bright spot in each pixel row, the first relationship corresponding to each row of pixels at the first scanning angle may be used to obtain the depth of each part of the to-be-measured object which is irradiated by the light beam at this scanning angle, thereby, the point cloud at this scanning angle is obtained. Then images collected at other scanning angles may be obtained, by which the depths of the respective parts of the to-be-measured object which are irradiated by the light beam at other scanning angles may be obtained as well, thereby the point clouds corresponding to the other scanning angles are obtained. Accordingly, a three-dimensional point cloud of the to-be-measured object may be obtained according to the point clouds at different scanning angles.

In the three-dimensional scanning ranging device, which is provided by embodiments of the present application, a three-dimensional point cloud of the to-be-measured object is determined by means of the first relationship at different scanning angles and in different pixel rows, therefore, the frame rate and point cloud density of 3D point cloud can be increased by increasing the left-right scanning speed of the optical scanning chip, reducing the step value of scanning angle, and increasing the frame rate and the pixel resolution rate of the CCD, thereby the accuracy of ranging is improved.

Embodiment 2

Figure 3:
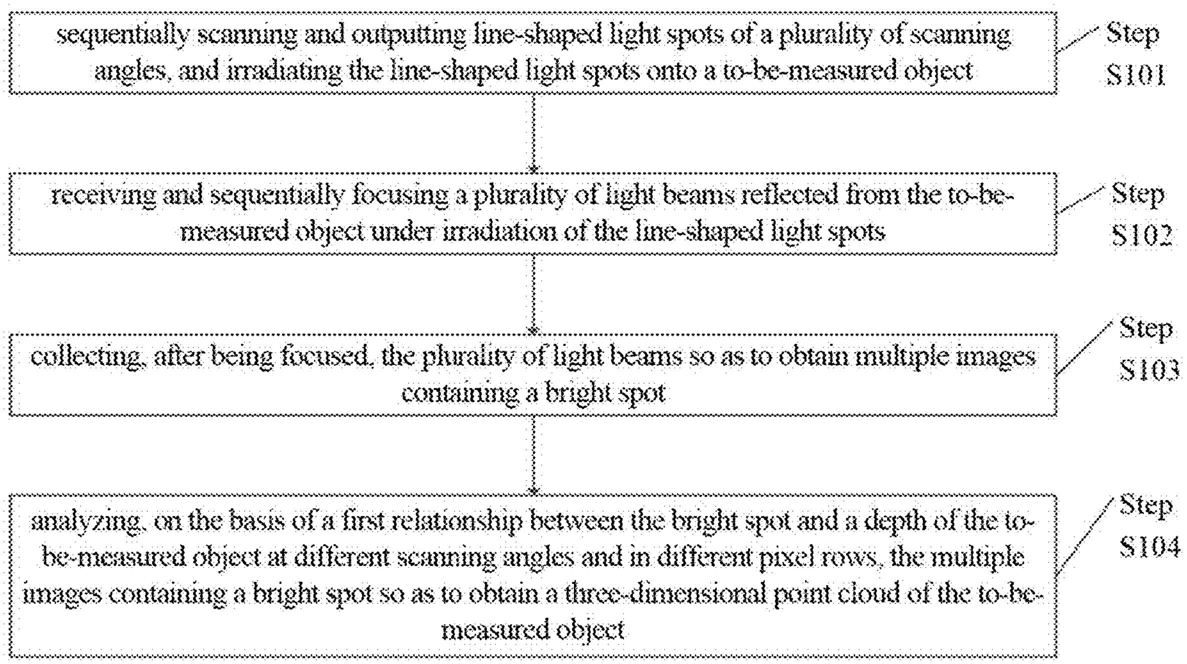
FIG. 3 is a flowchart of a three-dimensional scanning ranging method in an embodiment of the present application.

Provided by an embodiment of the present application is a three-dimensional scanning ranging method, as shown in FIG. 3, which may include the following steps:

Step S101: sequentially scanning and outputting line-shaped light spots of a plurality of scanning angles, and irradiating the line-shaped light spots onto a to-be-measured object; wherein, in an embodiment, an optical scanning chip may be adopted to achieve reciprocating scanning of vertically line-shaped light spots in the horizontal direction, and the optical scanning chip may be selected from any one of an optical phased array, an optical switch and a MEMS optical scanning mirror;

Step S102: receiving and sequentially focusing a plurality of light beams reflected from the to-be-measured object under irradiation of the line-shaped light spots; wherein, to be specific, a focusing lens may be adopted to receive a plurality of light beams reflected from the to-be-measured object under irradiation of the line-shaped light spots and perform a focusing of the light beams, other components may also be adopted to focus the beams, and the present application is not limited thereto;

Step S103: collecting, after being focused, the plurality of light beams so as to obtain multiple images containing a bright spot; wherein, to be specific, a light receiving element such as a CCD may be adopted to capture the focused beam, and the obtained images are in one-to-one correspondence with the scanning angles; and Step S104: analyzing, on the basis of a first relationship between the bright spot and a depth of the to-be-measured object at different scanning angles and in different pixel rows, the multiple images containing a bright spot so as to obtain a three-dimensional point cloud of the to-be-measured object.

To be specific, when the multiple images containing a bright spot is analyzed, firstly, the image collected at the first scanning angle may be obtained, and the numerical values of each row of pixels in the image may be analyzed so as to obtain the location of the bright spot in each pixel row. The first relationship corresponding to each row of pixels at the first scanning angle may be used to obtain the depth of each part of the to-be-measured object which is irradiated by the light beam at this scanning angle, thereby, the point cloud at this scanning angle is obtained. Then images collected at other scanning angles may be obtained, by which the depths of the respective parts of the to-be-measured object which are irradiated by the light beam at other scanning angles may be obtained as well, thereby the point clouds corresponding to the other scanning angles are obtained. Accordingly, a three-dimensional point cloud of the to-be-measured object may be obtained according to the point clouds at different scanning angles.

In the three-dimensional scanning ranging method, which is provided by embodiments of the present application, a to-be-measured object may be scanned by adopting a line-shaped light spot. A bright spot image may be obtained by reflecting and focusing after irradiating line-shaped light spots onto the to-be-measured object. Because there exists a nonlinear relation between the location of the bright spot and the depth of the to-be-measured object, the depth of the object can be obtained according to the location of the bright spot in a bright spot image on the basis of the nonlinear relation, thereby obtaining a three-dimensional point cloud of the to-be-measured object. Therefore, the three-dimensional scanning ranging method, which is provided by embodiments of the present application, achieves the functionalities of 3D Solid-state LiDARs by the way of line-shaped light spot scanning, thereby a relatively better ranging accuracy in short-distance ranging is achieved.

Figure 4:
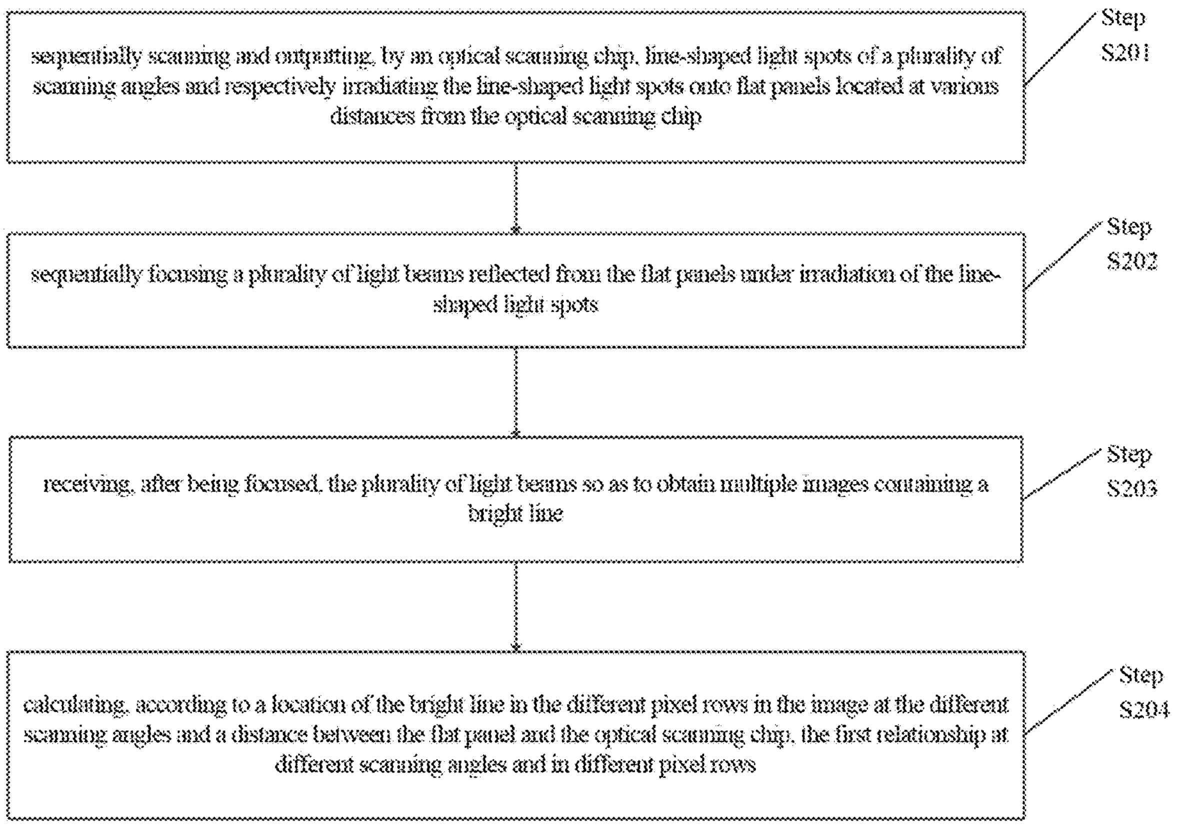
FIG. 4 is a flowchart of establishing a first relationship in a three-dimensional scanning ranging method in an embodiment of the present application.

In an embodiment, since the light output by the optical scanning chip is in a vertical line shape, when the to-be-measured object is a vertical flat panel and the scanning angle of the optical scanning chip is at a certain angle, the image presented on the CCD would be a quasi-vertical bright line, accordingly, in order to determine the first relationship between a location of a bright spot of different scanning angles and the depth of the to-be-measured object, A flat panel may be used as the to-be-measured object to perform a calculation thereon. Herein, the relationship between the location x of the bright spot the depth y may be generally expressed as $y=f(a_0, a_1, \ldots a_n, x)$, for a bright spot at the same scanning angle, it indicates that n constants need to be calculated, that is, forming simultaneous equations of n equations by actually measuring n groups of y values and x values, thereby figuring out the values of $a_0$ to $a_n$. In an embodiment, as shown in FIG. 4, the first relationship may be determined by adopting the following steps:

Step S201: sequentially scanning and outputting, by an optical scanning chip, line-shaped light spots of a plurality of scanning angles and respectively irradiating the line-shaped light spots onto flat panels located at various distances from the optical scanning chip; wherein, to be specific, in order to figure out n constants, a flat panel may be respectively placed at n different locations, that is, horizontal distances between the flat panel and the optical scanning chip are respectively $d_0$, $d_1$, $d_2$ . . . $d_{n-1}$, then the optical scanning chip may be adopted to perform scanning with line-shaped light spots respectively on the flat panel at the n locations;

Step S202: sequentially focusing a plurality of light beams reflected from the flat panels under irradiation of the line-shaped light spots;

Step S203: receiving, after being focused, the plurality of light beams so as to obtain multiple images containing a bright line; wherein, to be specific, when there are m scanning angle, after scanning the flat panel at n locations, m*n images can be captured; and Step S204: calculating, according to a location of the bright line in the different pixel rows in the image at the different scanning angles and a distance between the flat panel and the optical scanning chip, the first relationship at different scanning angles and in different pixel rows. In a specific embodiment, firstly, n images at the first scanning angle may be obtained, and the numerical values of the first row of pixels in the n images may be analyzed so as to obtain the location with the highest brightness in the first row of pixels. By determining the distance between this location and the leftmost edge of the CCD, the locations of the n bright spots corresponding to the n locations may be obtained, so that n simultaneous equations may be obtained. By solving the n equations, the values of the n parameters of the first relationship may be obtained, so as to obtain the first relationship corresponding to the first row of pixels at the first scanning angle. Then, other pixel rows in the image may be selected, and first relationships corresponding to other pixel rows may be obtained according to the above method. After that, the images obtained by the optical scanning chip at other scanning angles may be obtained so as to obtain the first relationships of the respective different pixel rows corresponding to the other scanning angles, and finally obtain the first relationship at m scanning angles and in different pixel rows.

It should be noted that, due to the focusing lens, the image formed on the CCD is not an ideal vertical bright line, in which there is a tiny radian. Therefore, it is necessary to analyze each row of pixels separately so as to obtain the first relationship corresponding to each row of pixels.

Embodiment 3

Provided by an embodiment of the present application is a three-dimensional scanning ranging method, which is divided into two processes: calibration and measurement. Here, firstly, the first relationship between the location of the bright spot and the depth of the object may be determined by calibration, and then a depth of the to-be-measured object may be measured by adopting the first relationship.

In an embodiment, the nonlinear relation between the location x of the bright spot and the depth y of the object is expressed by $y=f(a_0, a_1, \ldots a_n, x)$. There are n constants that need to be determined in this relationship, and these n constants can be obtained by distance calibration. That is, simultaneous equations of n equations are formed by actually measuring n groups of y values and x values, thereby figuring out the values of $a_0$ to $a_n$. Too many constants may increase the complexity of the calibration, so n=3 may be selected. In a specific embodiment, the relationship between x and y can be expressed as $y=a_0/(x+a_1)-a_2$.

Figure 5:
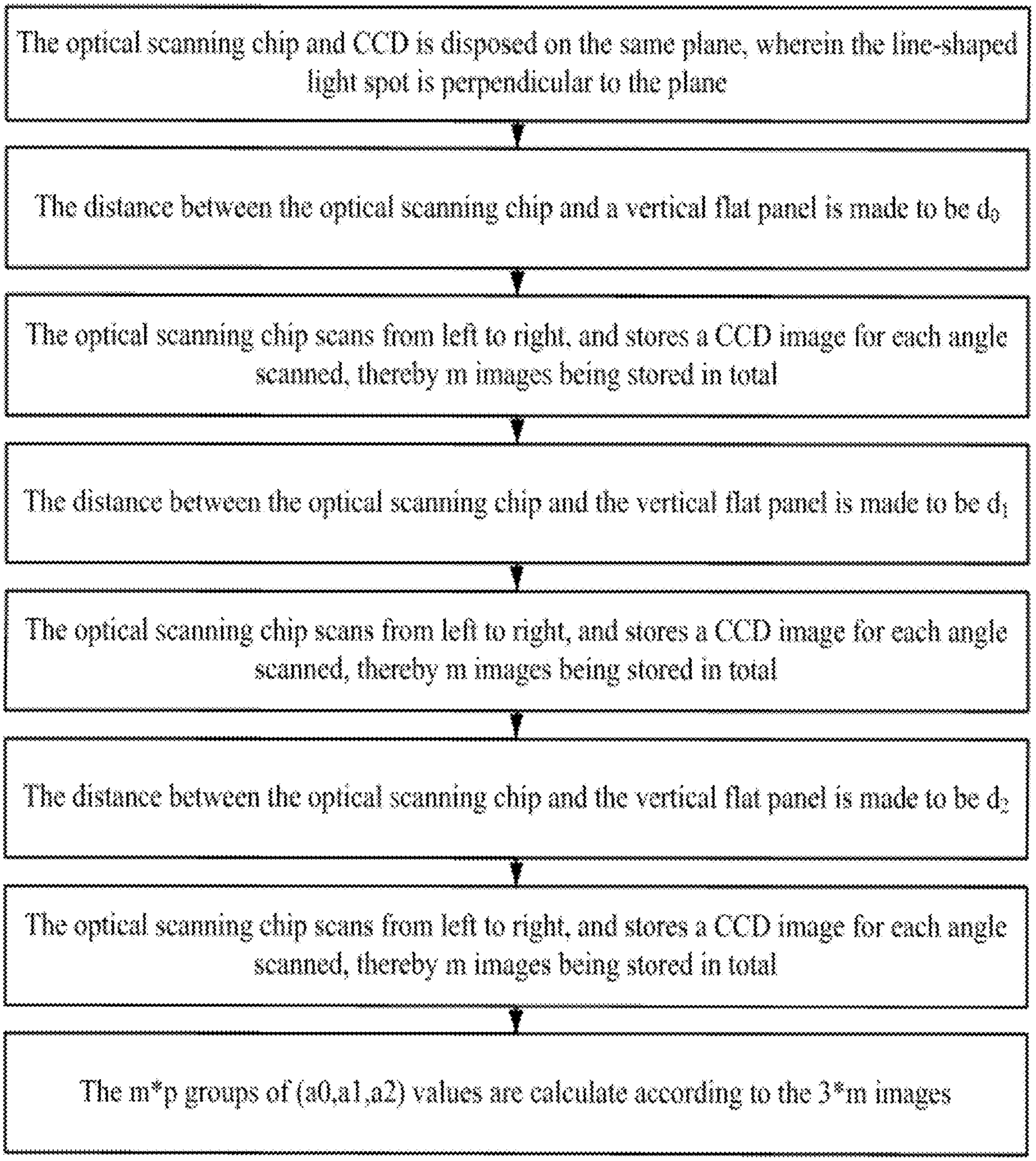
FIG. 5 is a flowchart of establishing a first relationship in a three-dimensional scanning ranging method in another embodiment of the present application.

In the actual calibration process, as shown in FIG. 5, firstly, the optical scanning chip and the CCD are placed on the same plane, wherein a line-shaped light spot output by the optical scanning chip is perpendicular to the plane. A flat panel is placed at a location at a horizontal distance of $d_0$ from the optical scanning chip. The optical scanning chip scans from left to right, and stores a CCD image for each angle scanned. Assuming that m angles are scanned out by the optical scanning chip in the horizontal direction, there will be m images stored in total. The flat panel is placed at another location at a horizontal distance of $d_1$ from the optical scanning chip. The optical scanning chip scans from left to right, and stores a CCD image for each angle scanned, thereby m images being stored in total. The flat panel is placed place at a location at a horizontal distance of $d_2$ from the optical scanning chip. The optical scanning chip scans from left to right, and stores a CCD image for each angle scanned, thereby m images being stored in total. The m*p groups of ($a_0$, $a_1$, $a_2$) values are calculated according to the 3*m images, where p represents that the CCD has p rows of pixels.

To be specific, during the calculation, firstly, three images at the first scanning angle may be obtained, and the numerical values of the first row of pixels in each of the three images may be analyzed so as to obtain the location with the highest brightness in the first row of pixels. By determining the distance between this location and the leftmost edge of the CCD, the positions of the three bright spots corresponding to the three locations may be obtained, thereby three equations may be obtained, and thus, the first relationship corresponding to the first row of pixels at the first scanning angle may be obtained. Then, the other p−1 rows of pixels in the image may be selected, and the first relationship corresponding to the other rows of pixels may be obtained according to the above method. After that, the images obtained by the optical scanning chip at other scanning angles may be selected so as to obtain the first relationship of the respective different pixel rows at other scanning angles, and finally obtain the first relationship at m scanning angles and in p rows of pixels.

Figure 6:
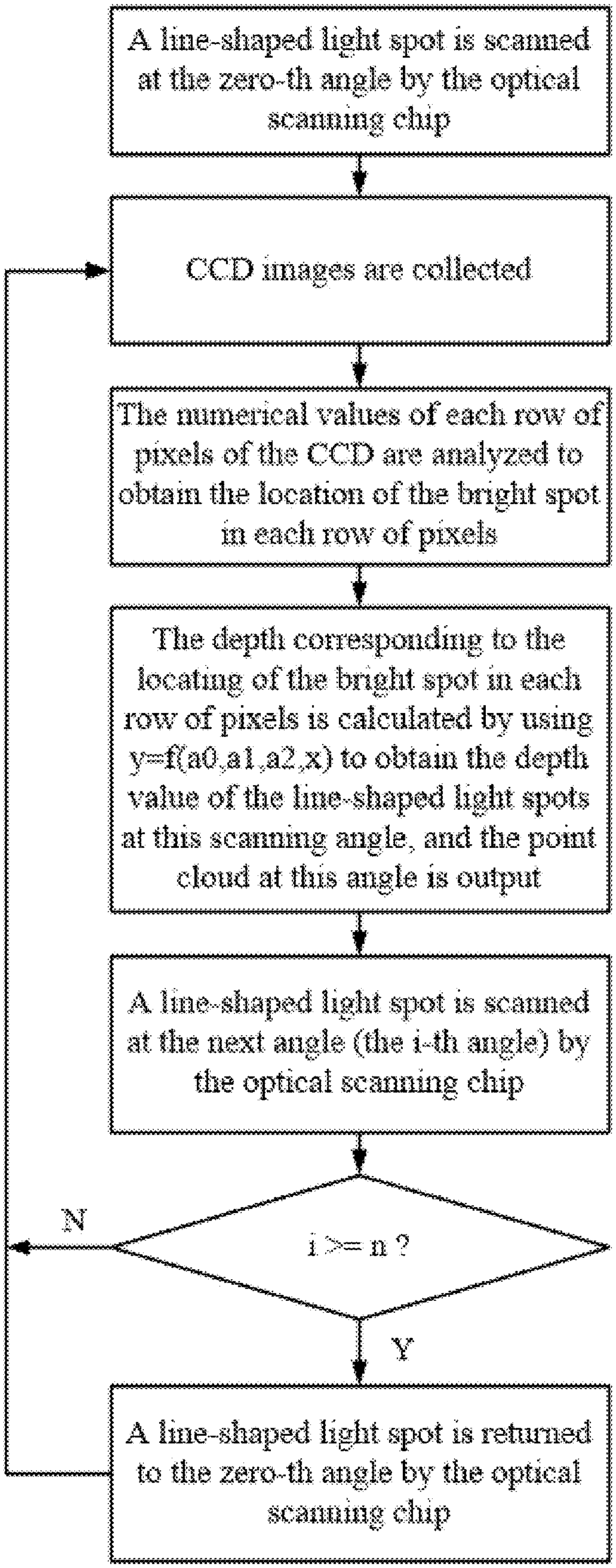
FIG. 6 is a flowchart of a three-dimensional scanning ranging method in another embodiment of the present application.

In an embodiment, in the process of measurement, the relative location between the optical scanning chip and the CCD is required to be exactly the same as that in the process of calibration. In the specific measurement, as shown in FIG. 6, a line-shaped light spot is scanned at the first angle by the optical scanning chip, and an CCD image is collected, which is obtained by reflecting and focusing performed on the to-be-measured object, and the numerical values of each row of pixels in the image may be analyzed so as to obtain the location of the bright spot in each pixel row. The first relationship corresponding to each row of pixels at the first scanning angle may be used to obtain the depth of the part of the to-be-measured object which is irradiated by the light beam at this scanning angle, thereby, the point cloud at this scanning angle is obtained. Then images collected at other scanning angles may be obtained, by which the depths of the respective parts of the to-be-measured object which are irradiated by the light beam at other scanning angles may be obtained as well, thereby the point clouds corresponding to the respective scanning angles are obtained. Accordingly, a three-dimensional point cloud of the to-be-measured object may be obtained according to the point clouds at the respective different scanning angles.

Although the exemplary embodiments and the advantages thereof have been described in detail herein, various alterations, substitutions and modifications may be made to the embodiments by those skilled in the art without departing from the gist of the present application and the scope of protection as defined by the appended claims, and such alterations and modifications all fall into the scope defined by the appended claims. As for other examples, it may be easily appreciated by those skilled in the art that the sequence of the process steps may be changed without departing from the protection scope of the present application.

In addition, the scope, to which the present application is applied, is not limited to the process, mechanism, manufacture, material composition, means, methods and steps of the specific embodiments described in the present specification. Those skilled in the art should readily appreciate from the disclosure of the present application that the process, mechanism, manufacture, material composition, means, methods and steps currently existing or to be developed in future, which perform substantially the same functions or achieve substantially the same results as that in the corresponding embodiments described in the present application, may be applied according to the present application. Therefore, the appended claims of the present application are intended to include these process, mechanism, manufacture, material composition, means, methods and steps within the scope of protection thereof.

What is claimed is:

1. A three-dimensional scanning ranging device, comprising an optical scanning chip, a focusing lens, a light receiving element and a microprocessor, wherein:

the optical scanning chip is used for sequentially scanning and outputting line-shaped light spots of a plurality of scanning angles, and irradiating the line-shaped light spots onto a to-be-measured object;

the focusing lens is used for sequentially focusing a plurality of light beams reflected from the to-be-measured object under irradiation of the line-shaped light spots;

the light receiving element is used for sequentially receiving the plurality of light beams focused by the focusing lens so as to obtain multiple images containing a bright spot; and the microprocessor is coupled to the light receiving element and is used for receiving the multiple images containing a bright spot, and analyzing, on the basis of a first relationship between the bright spot and a depth of the to-be-measured object at different scanning angles and in different pixel rows, the multiple images containing a bright spot so as to obtain a three-dimensional point cloud of the to-be-measured object;

wherein the optical scanning chip, the focusing lens, the light receiving element and the microprocessor are further used for establishing the first relationship, and wherein:

the optical scanning chip is further used for sequentially scanning and outputting line-shaped light spots of the plurality of scanning angles and respectively irradiating the line-shaped light spots onto flat panels located at various distances from the optical scanning chip;

the focusing lens is further used for sequentially focusing a plurality of light beams reflected from the flat panels under irradiation of the line-shaped light spots;

the light receiving element is further used for sequentially receiving the plurality of light beams focused by the focusing lens so as to obtain multiple images containing a bright line; and the microprocessor is further used for receiving the multiple images containing a bright line, and calculating, on the basis of a location of the bright line and a distance between the flat panel and the optical scanning chip, the first relationship at different scanning angles and in different pixel rows.

2. The three-dimensional scanning ranging device according to claim 1, wherein the optical scanning chip, the focusing lens and the light receiving element are located on a same plane.

3. The three-dimensional scanning ranging device according to claim 1, wherein a distance between the optical scanning chip and the light receiving element is a fixed value.

4. The three-dimensional scanning ranging device finding according to claim 1, wherein the optical scanning chip comprises any one of an optical phased array, an optical switch and a MEMS optical scanning mirror.

5. The three-dimensional scanning ranging device according to claim 1, wherein the light receiving element is a charge-coupled device or a CMOS camera.

6. A three-dimensional scanning ranging method, comprising:

sequentially scanning and outputting line-shaped light spots of a plurality of scanning angles, and irradiating the line-shaped light spots onto a to-be-measured object;

receiving and sequentially focusing a plurality of light beams reflected from the to-be-measured object under irradiation of the line-shaped light spots;

collecting, after being focused, the plurality of light beams so as to obtain multiple images containing a bright spot; and analyzing, on the basis of a first relationship between the bright spot and a depth of the to-be-measured object at different scanning angles and in different pixel rows, the multiple images containing a bright spot so as to obtain a three-dimensional point cloud of the to-be-measured object;

wherein the first relationship between the bright spot and a depth of the to-be-measured object at different scanning angles and in different pixel rows is calculated by the following steps:

sequentially scanning and outputting, by an optical scanning chip, the line-shaped light spots of the plurality of scanning angles and respectively irradiating the line-shaped light spots onto flat panels located at various distances from the optical scanning chip;

sequentially focusing a plurality of light beams reflected from the flat panels under irradiation of the line-shaped light spots;

receiving, after being focused, the plurality of light beams so as to obtain multiple images containing a bright line;

calculating, according to a location of the bright line in the different pixel rows in the image at the different scanning angles and a distance between the flat panel and the optical scanning chip, the first relationship at different scanning angles and in different pixel rows.

7. The three-dimensional scanning ranging method according to claim 6, wherein the analyzing, on the basis of a first relationship between the bright spot and a depth of the to-be-measured object at different scanning angles and in different pixel rows, the multiple images containing a bright spot so as to obtain a three-dimensional point cloud of the to-be-measured object comprises:

analyzing the multiple images containing a bright spot so as to obtain a location of the bright spot in each pixel row in each of the multiple images;

acquiring, on the basis of the first relationship, depth information corresponding to the location of the bright spot in each pixel row;

acquiring, according to the depth information, a point cloud corresponding to each of the scanning angles;

acquiring, according to all of the point clouds corresponding respectively to all of the scanning angles, the three-dimensional point cloud of the to-be-measured object.

8. The three-dimensional scanning ranging method according to claim 6, wherein the sequentially scanning and outputting, by an optical scanning chip, the line-shaped light spots of the plurality of scanning angles and respectively irradiating the line-shaped light spots onto flat panels located at various distances from the optical scanning chip comprises:

placing the flat panel at a first location that is at a first distance from the optical scanning chip;

scanning, by using the line-shaped light spots, the flat panel that is at the first location;

changing a horizontal distance between the flat panel and the optical scanning chip; and sequentially scanning, by using the line-shaped light spots, the flat panel at various locations.

9. The three-dimensional scanning ranging device according to claim 1, wherein the optical scanning chip, the focusing lens and the light receiving element are located on a same plane.

10. The three-dimensional scanning ranging device according to claim 1, wherein a distance between the optical scanning chip and the light receiving element is a fixed value.

11. The three-dimensional scanning ranging device finding according to claim 1, wherein the optical scanning chip comprises any one of an optical phased array, an optical switch and a MEMS optical scanning mirror.

12. The three-dimensional scanning ranging device according to claim 1, wherein the light receiving element is a charge-coupled device or a CMOS camera.

* * * * *